(12) United States Patent
Delmar et al.

(10) Patent No.: US 10,190,709 B2
(45) Date of Patent: Jan. 29, 2019

(54) SYSTEMS AND METHODS OF COUPLING PIPES

(71) Applicant: Halliburton Energy Services, Inc., Houston, TX (US)

(72) Inventors: Ludovic Delmar, Braine l'alleud (BE); Eric Fannes, Wallonia (BE)

(73) Assignee: Halliburton Energy Services, Inc., Houston, TX (US)

( * ) Notice: Subject to any disclaimer, the term of this patent is extended or adjusted under 35 U.S.C. 154(b) by 1086 days.

(21) Appl. No.: 14/360,679

(22) PCT Filed: Jul. 18, 2013

(86) PCT No.: PCT/US2013/051058
§ 371 (c)(1),
(2) Date: May 27, 2014

(87) PCT Pub. No.: WO2015/009305
PCT Pub. Date: Jan. 22, 2015

(65) Prior Publication Data
US 2015/0115604 A1 Apr. 30, 2015

(51) Int. Cl.
*F16L 21/06* (2006.01)
*F16L 37/138* (2006.01)
*F16L 21/08* (2006.01)

(52) U.S. Cl.
CPC .............. *F16L 21/06* (2013.01); *F16L 21/08* (2013.01); *F16L 37/138* (2013.01)

(58) Field of Classification Search
CPC .......... F16L 21/06; F16L 21/08; F16L 37/138
See application file for complete search history.

(56) References Cited

U.S. PATENT DOCUMENTS 4,521,037 A 6/1985 Knox
4,557,508 A * 12/1985 Walker .................. E21B 33/038
285/315

(Continued)

FOREIGN PATENT DOCUMENTS

CN 1687627 A 10/2005
CN 201428892 Y 3/2010
WO 2015009305 A1 1/2015

OTHER PUBLICATIONS

Office Action received in corresponding Chinese Application No. 2013800767036, dated May 31, 2016.

(Continued)

*Primary Examiner* — James M Hewitt, II
(74) *Attorney, Agent, or Firm* — Alan Bryson; Tumey L.L.P.

(57) ABSTRACT

Disclosed are systems and methods of coupling plain end pipes. One system includes a coupling sleeve having opposing upper and lower ends and a plurality of axially extending slots defined in each end, wherein the upper end is configured to receive an end of a first pipe and the lower end is configured to receive an end of a second pipe, an upper sliding ring disposed about the coupling sleeve and axially movable in a first direction to force the upper end into gripping engagement with an outer surface of the first pipe, and a lower sliding ring disposed about the coupling sleeve and axially movable in a second direction to force the lower end into gripping engagement with an outer surface of the second pipe.

18 Claims, 3 Drawing Sheets

(56) References Cited

U.S. PATENT DOCUMENTS

| | | | |
|---|---|---|---|
| 4,614,369 A * | 9/1986 | Overath | F16L 37/138 |
| | | | 138/109 |
| 4,762,583 A * | 8/1988 | Kaempen | B29C 53/564 |
| | | | 156/173 |
| 4,886,304 A | 12/1989 | Kunsman | |
| 5,265,917 A * | 11/1993 | Hitz | F16L 37/138 |
| | | | 285/315 |
| 6,318,761 B1 | 11/2001 | Robertson | |
| 7,090,257 B2 | 8/2006 | Werth | |
| 2010/0207387 A1 * | 8/2010 | Stroempl | F16L 33/225 |
| | | | 285/382.2 |
| 2011/0203790 A1 | 8/2011 | Carstensen | |
| 2012/0205910 A1 | 8/2012 | Danhash | |
| 2013/0049361 A1 * | 2/2013 | Salehi-Bakhtiari | F16L 37/138 |
| | | | 285/374 |
| 2013/0093184 A1 * | 4/2013 | Peirce | B25B 27/10 |
| | | | 285/323 |

OTHER PUBLICATIONS

International Search Report and Written Opinion for PCT/US2013/051058 dated Apr. 24, 2014.

* cited by examiner

SYSTEMS AND METHODS OF COUPLING PIPES

This application is a National Stage entry of and claims priority to International Application No. PCT/US2013/051058, filed on Jul. 18, 2013.

BACKGROUND

The present application is related to coupling devices and, more particularly, to systems and methods of coupling plain end pipes.

Pipes can be coupled together in a variety of ways to provide a continuous tubular conduit. For example, some pipes are welded, fused, or otherwise adhesively attached together. Other pipes may be threaded such that one pipe can be threadably engaged to another. The formation of such pipe joints in these manners can be laborious and time-consuming. Moreover, the manufacturing of threaded pipes can be quite costly as opposed to producing plain end pipes.

Mechanical couplings for plain end pipes have been proposed previously, which do not require threading of the pipe ends or welding or adhesive attachment of the connecting fittings. However, such constructions are often relegated to small diameter piping systems operating at relatively low pressures since problems of coupling slippage on the pipe ends can arise through axial loading of the pipes.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application is related to coupling devices and, more particularly, to systems and methods of coupling plain end pipes.

Disclosed is a system and method of coupling plain end pipes together using a coupling system. The coupling system may include a coupling sleeve that includes a pair of sliding rings. The coupling sleeve is slotted at each end and the upper and lower sliding rings are configured to be forced in opposing directions over at least a portion of the slots to secure the corresponding ends of the coupling sleeve to the pipes, and thereby secure the two pipes together. The inner radial surface of the ends of the coupling sleeve may have teeth defined thereon in order to grip the outer surface of the pipes. Alternatively, some type of gripping material or the like may be disposed thereon such that a good gripping engagement of the outer surface of each pipe is attained. By forcing the sliding rings towards the respective ends of the coupling sleeve, the ends are forced against the outer surface of the pipes and a gripping or clamping engagement may result.

The coupling system may prove advantageous in reducing manufacturing costs since the pipes being coupled would not need to be threaded for attachment. This results in reducing consumable costs. Moreover, the coupling system is re-usable such that it may be engaged on one pair of pipes, disengaged by reversing the sliding rings, and subsequently re-engaged on another pair of pipes.

Figure 1:
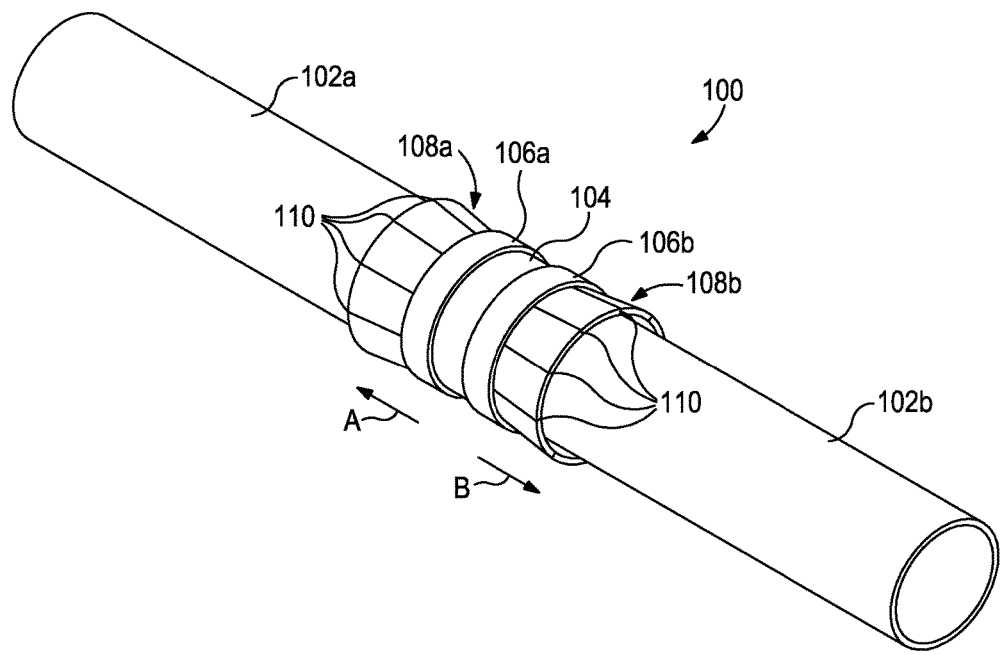
FIG. 1 illustrates an isometric view of an exemplary coupling system, according to one or more embodiments.

Referring to FIG. 1, illustrated is an exemplary coupling system 100, according to one or more embodiments of the present disclosure. The coupling system 100 may prove useful in coupling pipes together, such as a first or upper pipe 102a and a second or lower pipe 102b. The pipes 102a,b may be employed in various technology fields and, therefore, may be made of a variety of materials. For example, the pipes 102a,b may be made of materials such as, but not limited to, metals (e.g., steel, iron, aluminum, copper, copper alloys, etc.), plastics, composite materials (e.g., fiber glass, carbon fiber, etc.), and any combination thereof.

In at least one embodiment, the coupling system 100 may prove useful in coupling lengths of pipe or conduit together for use in the oil and gas industry. Accordingly, the pipes 102a,b may be any type of pipe used in the exploration, preparation, and production of hydrocarbons from subterranean hydrocarbon-bearing reservoirs. For example, the pipes may include, but are not limited to, drill pipe, production tubing, casing string, coring pipes or tubulars (e.g., core barrel inner tubes, cementing stingers, etc.), or any other tubular conduit used in the oil and gas industry. Those skilled in the art, however, will readily appreciate the usefulness of the coupling system 100 in other industries and applications.

In some embodiments, one or both of the upper and lower pipes 102a,b may be plain end pipes, meaning that the corresponding ends of the pipes 102a,b are generally cylindrical, of the same general dimension (i.e., exhibiting the same or substantially similar diameters), and otherwise do not define any threads or grooves on their respective outer surfaces. In other embodiments, one or both of the upper and lower pipes 102a,b may define threads or grooves on their respective outer or inner surfaces, without departing from the scope of the disclosure. In yet other embodiments, as will be discussed in greater detail below, the ends of each pipe 102a,b may be slightly tapered or otherwise frustoconical such that a slimmer design or overall coupling package may result.

In order to couple the pipes 102a,b together, the coupling system 100 may include a coupling sleeve 104 and a pair of sliding rings disposed about the coupling sleeve and shown as an upper sliding ring 106a and a lower sliding ring 106b. The coupling sleeve 104 may be a generally cylindrical structure having opposing upper and lower ends 108a and 108b, respectively. As illustrated, a series of axially extending slots 110 may be formed or otherwise defined in the coupling sleeve 104 at each end 108a,b. The slots 110 may extend completely through the coupling sleeve 104, thereby providing the sleeve 104 with the capability of collapsing or otherwise compressing radially inward, as described below. In some embodiments, the slots 110 may be equidistantly spaced about the circumference of the corresponding ends 108a,b. In other embodiments, however, one or more of the slots 110 may be randomly spaced from each other about the circumference of the ends 108a,b.

The sliding rings 106a,b may be generally annular and made of a rigid material, such as one of the materials from which the pipes 102a,b are made. Briefly, to secure the coupling sleeve 104 to the upper and lower pipes 102a,b, and thereby couple the pipes 102a,b together, the sliding rings 106a,b may be moved axially in opposing directions relative to the sleeve 104, shown as directions A and B, respectively. As the sliding rings 106a,b move in their opposing directions A and B, they may be configured to force the upper and lower ends 108a,b of the sleeve 104 into clamping and gripping engagement with the exterior surface of the associated pipe 102a,b.

Figure 2:
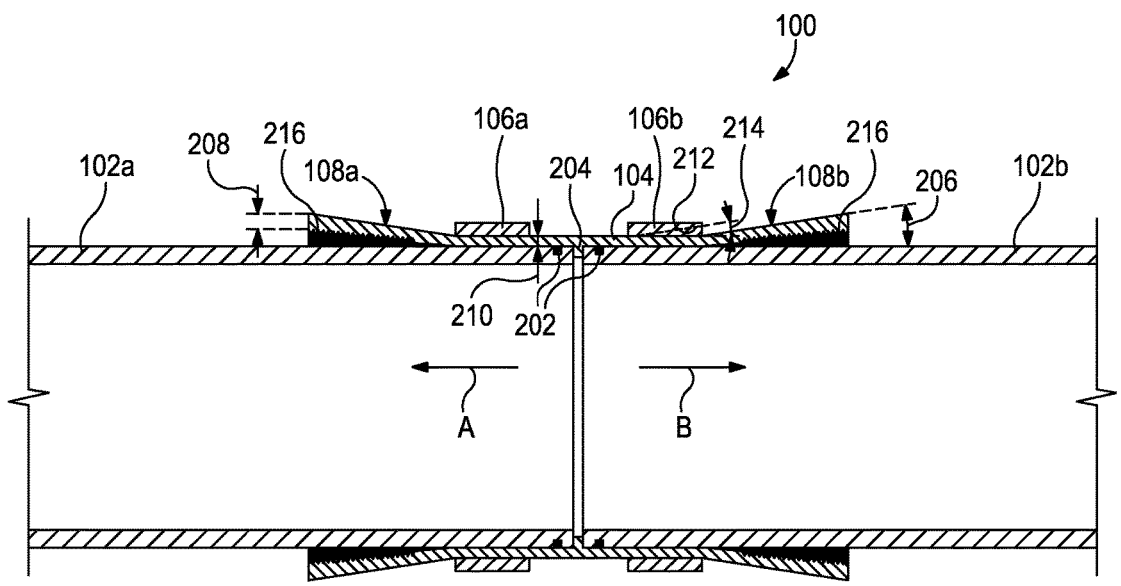
FIG. 2 illustrates a cross-sectional view of the coupling system of FIG. 1.

Referring now to FIG. 2, with continued reference to FIG. 1, illustrated is a cross-sectional view of the coupling system 100. As illustrated, the coupling system 100 may further include at least two seals 202 configured to seal the interface between the coupling sleeve 104 and each of the pipes 102a,b. In some embodiments, at least one of the seals 202 may be an elastomeric O-ring, as generally illustrated. In other embodiments, however, at least one of the seals 202 may be another type of seal including, but not limited to, a quad ring, a sealing compound, Teflon tape, a gasket, combinations thereof, and the like.

The seals 202 may be fitted into corresponding grooves defined in the outer surface of the pipes 102a,b, as illustrated. In other embodiments, however, the seals 202 may be fitted into corresponding grooves (not shown) defined in the inner surface of the coupling sleeve 104 so as to avoid unnecessary machining of the pipes 102a,b. In yet other embodiments, the seals 202 may be fitted into a combination of grooves (not shown) formed in both the pipes 102a,b and the coupling sleeve 104, without departing from the scope of the disclosure.

In the illustrated embodiment, the coupling sleeve 104 may provide or otherwise define a coupling restriction 204 at an intermediate point between the upper and lower ends 108a,b. The coupling restriction 204 may be an annular protrusion that extends radially inward from the inner surface of the coupling sleeve 104. In exemplary operation, the coupling restriction 204 may be used to engage the corresponding ends of the upper and lower pipes 102a,b and otherwise prevent the pipes 102a,b from being advanced too far into the coupling sleeve 104. As will be appreciated, advancing either pipe 102a,b within the sleeve 104 past its center point may risk forming an improper or defective coupling between the two pipes 102a,b. In the illustrated embodiment, the coupling restriction 204 is a generally square-shaped protrusion. In other embodiments, however, the coupling restriction may encompass other shapes, such as triangular, arcuate, ovoid, etc., without departing from the scope of the disclosure. Accordingly, the coupling restriction 204 may be included in the coupling system 100 for ease of fitting the pipes 102a,b into the coupling sleeve 104.

In some embodiments, as illustrated, the upper and lower ends 108a,b of the coupling sleeve 104 may be radially expanded or flared outward. The slots 110 (FIG. 1) formed in each end 108a,b may facilitate such radial expansion. As will be appreciated, radially expanding the ends 108a,b of the coupling sleeve 104 may allow the pipes 102a,b to more easily enter each end 108a,b of the coupling sleeve 104 during installation. For instance, the slots 110 may allow the distal portions of the upper and lower ends 108a,b to be bent radially outward such that the ends 108a,b may be radially expanded in their relaxed state and prepared to receive the pipes 102a,b. The radial expansion of each end 108a,b may be made or otherwise formed to a predetermined angle 206 with respect to the outer surface of the pipes 102a,b. For instance, the angle 206 of expansion can range anywhere from about 1° to about 15° from the outer surface of the pipes 102a,b. Those skilled in the art, however, will readily appreciate that angles 206 greater than 15° may also be used, without departing from the scope of the disclosure. Alternatively, the slots 110 may allow the distal portions of the upper and lower ends 108a,b to be forced radially outward, thereby making it easier to insert the pipes 102a,b at each end 108a,b.

In some embodiments, the upper and lower ends 108a,b of the coupling sleeve 104 may be thicker than the intermediate or central portions of the sleeve 104. More specifically, the coupling sleeve 104 may exhibit a first thickness 208 at one or both of the ends 108a,b while exhibiting a second thickness 210 that is less than the first thickness 208 at intermediate or more central locations along its axial length. In at least one embodiment, the first thickness 208 may be about 2 mm thicker than the second thickness 210 but, as will be appreciated, may be more than 2 mm, without departing from the scope of the disclosure. As will be appreciated, having thicker ends 108a,b may result in a more secure interference fit against the outer surface of each pipe 102a,b as the sliding rings 106a,b are forced over the ends 108a,b.

In some embodiments, one or both of the upper and lower sliding rings 106a,b may further define a tapered inner surface 212, as generally depicted by the phantom dashed lines on the lower sliding ring 106b. The tapered inner surface 212 of the sliding rings 106a,b may face the corresponding ends 108a,b of the coupling sleeve 104. Such tapered surfaces 212 may prove useful in distributing any stresses placed on the sliding rings 106a,b as they are forced in the opposing directions A and B and into sliding engagement with the radially expanded ends 108a,b that exhibit a greater thickness 208 than the remaining portions of the coupling sleeve 104. As illustrated, the tapered inner surface 212 may be tapered at an angle 214 from horizontal. For instance, the angle 214 may range anywhere from about 1° to about 15° from horizontal. In other embodiments, however, the angle 214 may be greater than 15°, without departing from the scope of the disclosure. In at least one embodiment, the angle 214 may substantially correspond to the angle 206 of the expanded ends 108a,b or the change in thickness between the second thickness 210 and the first thickness 208.

In one or more embodiments, one or both of the upper and lower ends 108a,b of the coupling sleeve 104 may define a gripping interface 216 on their respective inner surfaces. In some embodiments, the gripping interface 216 may encompass a series of teeth defined into the inner radial surface of the ends 108a,b, as illustrated. The teeth may be oriented or otherwise configured to resist axial or torsional loads, or a combination of both. As the sliding rings 106a,b are forced over the ends 108a,b, respectively, the teeth may be forced radially inward and into gripping engagement with the outer surface of the pipes 102a,b and otherwise configured to "bite" into the pipes 102a,b such that axial movement out of engagement with the coupling sleeve 104 is substantially prevented.

In other embodiments, however, the gripping interface 216 may be a grit or an abrasive material applied to the inner radial surface of each end 108a,b using adhesives or any other suitable means. The abrasive material may equally be applied to the outer surface of one or both of the pipes 102a,b, without departing from the scope of the disclosure.

The abrasive material used may be generally chosen to be of a hardness greater than that of the pipes 102a,b. Exemplary abrasive materials that could be used include, but art not limited to, carborundum (i.e., silicon carbide), flint, calcite, emery, diamond dust, novaculite, pumice dust, rouge, sand, borazon, ceramic, ceramic aluminium oxide, ceramic iron oxide, corundum (i.e., alumina or aluminium oxide), glass powder, steel abrasive, zirconia alumina, combinations thereof, and the like. Similar to the teeth, as the sliding rings 106a,b are forced over the ends 108a,b, respectively, the abrasive material may be forced radially inward and into gripping engagement with the outer surface of the pipes 102a,b such that axial movement of the pipes 102a,b out of engagement with the coupling sleeve 104 is substantially prevented.

Exemplary operation of the coupling system 100 is now provided. In order to couple the upper pipe 102a to the lower pipe 102b, each pipe 102a,b may be extended or otherwise "stabbed" into the coupling sleeve 104 at the opposing upper and lower ends 108a,b, respectively. Each pipe 102a,b may be advanced within the coupling sleeve until engaging or otherwise coming into close contact with the coupling restriction 204. As indicated above, the coupling restriction 204 may generally prevent the pipes 102a,b from advancing past that point within the coupling sleeve 104. The upper and lower sliding rings 106a,b may then be axially moved in opposing directions A and B, respectively, over the outer surface of the coupling sleeve 104.

The sliding rings 106a,b may be moved axially over the ends 108a,b of the coupling sleeve 104 via a variety of methods. For example, in some embodiments, a tool (not shown) may be used to force the sliding rings 106a,b in the opposing directions A and B. The tool may be a sledge hammer or another tool capable of delivering an impact force sufficient to axially move the sliding rings 106a,b. In other embodiments, the tool may be a plier device (not shown) configured to engage a respective end of the sliding rings 106a,b and a corresponding axial end of the upper and lower ends 108a,b. Upon applying compressive forces (e.g., manually, hydraulically, mechanically, electromechanically, etc.) to the pliers, the sliding rings 106a,b may be forced in their respective directions A and B and toward the corresponding ends 108a,b.

In yet other embodiments, one or both of the sliding rings 106a,b may be threaded to the outer surface of the coupling sleeve 104. In such embodiments, the sliding rings 106a,b may simply be rotated through the threaded engagement to advance toward the ends 108a,b of the coupling sleeve 104. The threads could be designed for either right hand or left hand threading, or a combination of both. As will be appreciated, this could be an advantage in a rotating environment to avoid breaking off connections.

Figure 3:
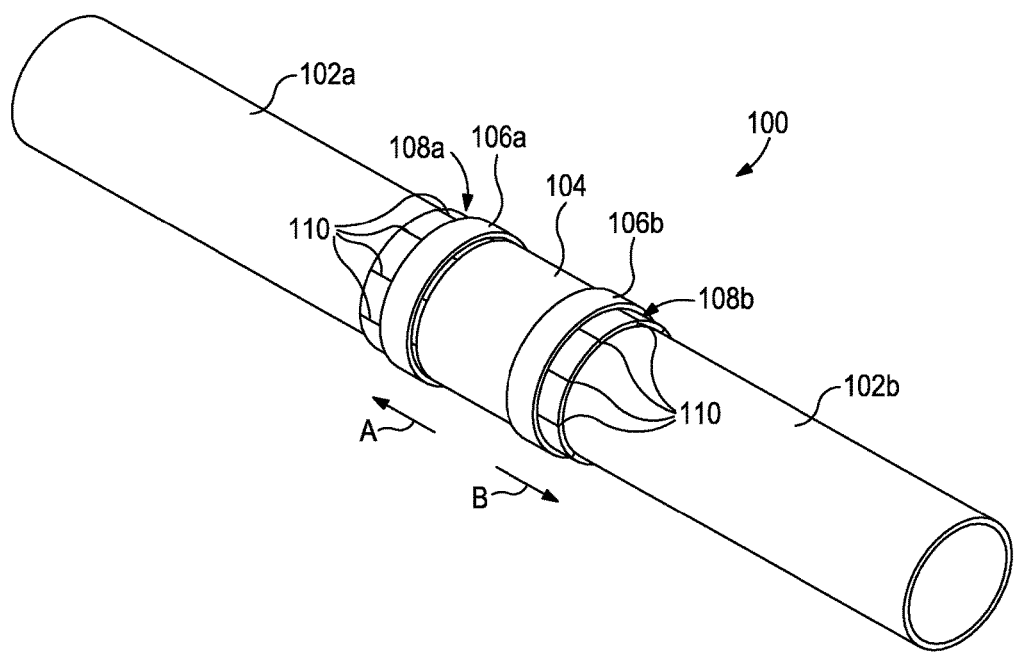
FIG. 3 illustrates an isometric view of the coupling system of FIG. 1 in an engaged configuration, according to one or more embodiments.
Figure 4:
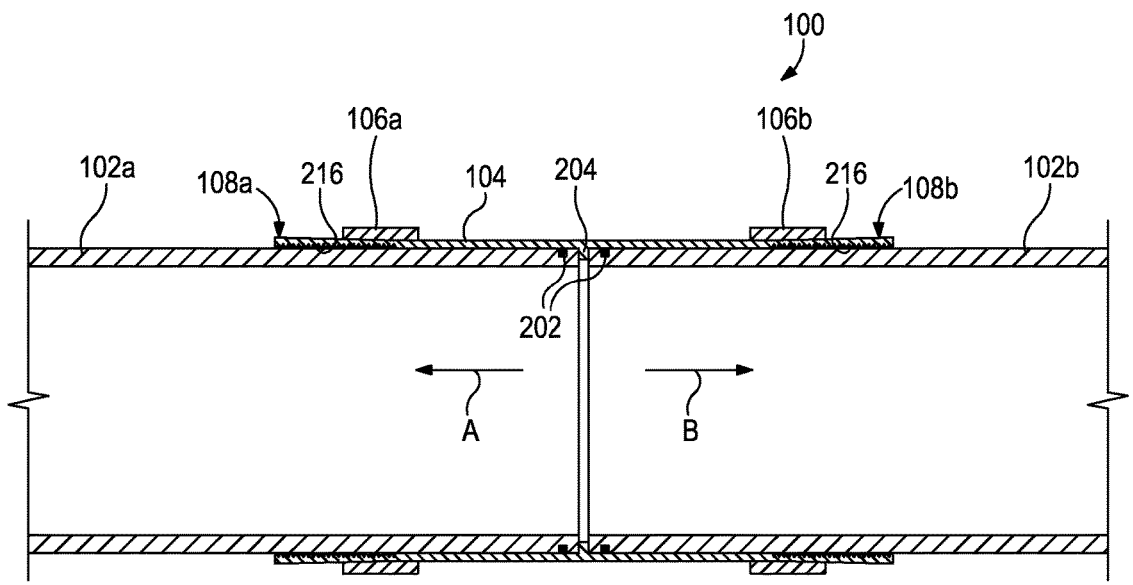
FIG. 4 illustrates a cross-sectional view of the engaged coupling system of FIG. 3.

Referring now to FIGS. 3 and 4, illustrated are isometric and cross-sectional views of the coupling system 100 in an engaged configuration, according to one or more embodiments. As the upper and lower sliding rings 106a,b are moved axially in the opposing directions A and B over the ends 108a,b of the coupling sleeve 104, respectively, the sliding rings 106a,b may force the ends 108a,b radially inward and into clamping and/or gripping engagement with the outer surface of the pipes 102a,b. As mentioned above, the gripping interface 216 of each end 108a,b may be configured to bite into the outer surface of the pipes 102a,b and otherwise prevent the pipes 102a,b from retracting from the coupling sleeve 104.

Because of the difference in thicknesses 208 and 210 (FIG. 2) between the ends 108a,b and the intermediate portions of the coupling sleeve 104, respectively, the sliding rings 106a,b may further be forced into an interference fit with the coupling sleeve 104. Moreover, the seals 202 may provide a substantially fluid-tight seal between the pipes 102a,b and the coupling sleeve 104. As a result, the coupling sleeve 104 may fluidly couple the pipes 102a,b such that the pipes 102a,b may essentially be characterized as a continuous fluid conduit.

In some embodiments, as briefly mentioned above, the ends of each of the upper and lower pipes 102a,b that are extended into the coupling sleeve 104 may be slightly tapered or otherwise frustoconical in shape (not shown). As depicted in FIG. 4, the outer diameter of the coupling system 100 extends past or is otherwise greater than the outer diameter of the pipes 102a,b. By designing the ends of the pipes 102a,b to taper or otherwise exhibit a frustoconical shape, the coupling system 100 may be able to secure itself in the engaged configuration and exhibit an outer diameter that is substantially equal to or otherwise less than the outer diameter of the pipes 102a,b. As a result, a more uniform overall outer diameter across the coupling system 100 and the pipes 102a,b may be achieved such that the coupling system 100 would be less likely to cause an axial obstruction upon introducing the coupled pipes 102a,b into another orifice.

Those knowledgeable in oil and gas exploration and production will readily appreciate the advantages that this provides. For example, in the oil and gas industry, tubular conduits are often introduced longitudinally into concentric wellbores or other tubular conduits (i.e., production tubing, drill pipe, etc.). If it exhibits a diameter substantially similar to the remaining portions of the pipe 102a,b, the coupling system 100 will be less likely to catch on profiles, shoulders or other ledges defined in such tubular conduits. Accordingly, pipes 102a,b that provide a slightly tapered outer surface or that are otherwise frustoconical in shape at its ends may result in a slimmer design or overall coupling package. Such improvements may be especially advantageous in coring operations, for instance, where the inner tube of the coring assembly may be connected to the remaining coring components using the couplings generally described herein.

Figure 5:
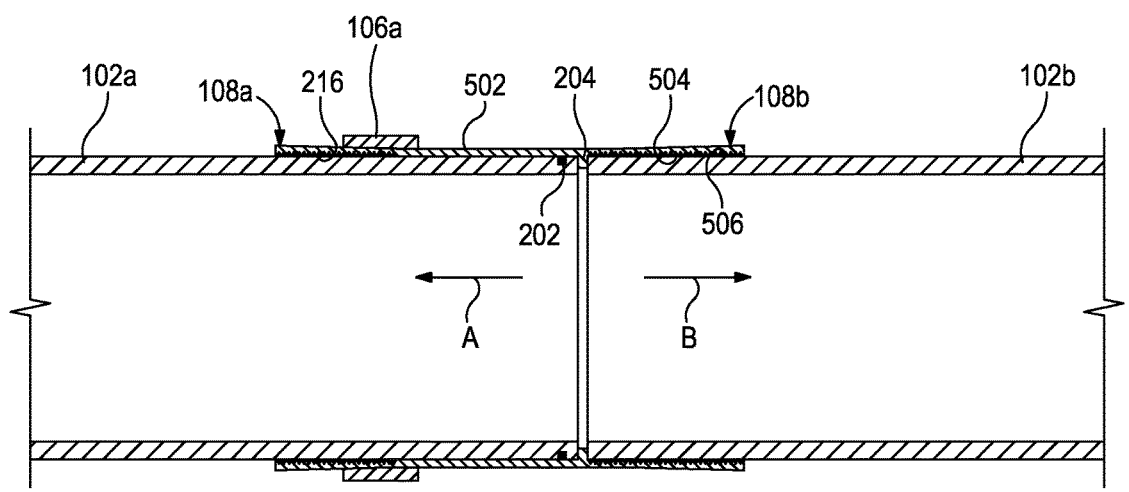
FIG. 5 illustrates a cross-sectional view of another exemplary coupling system, according to one or more embodiments.

Referring now to FIG. 5, with continued reference to FIGS. 1-4, illustrated is another coupling system 500 that may prove useful in coupling pipes together, according to one or more embodiments. The coupling system 500 may be substantially similar to the coupling system 100 of FIGS. 1-4. Accordingly, the coupling system 500 may be best understood with reference thereto, where like numerals correspond to like elements not described again in detail. As illustrated the coupling system 500 may include a coupling sleeve 502 used to couple the first and second pipes 102a,b together. The coupling sleeve 502 may be similar to the coupling sleeve 104 of FIGS. 1-4 in that the upper sliding ring 106a may be used to secure the upper end 108a of the coupling sleeve 502 to the upper (first) pipe 102a, as generally described above.

The second or lower end 108b of the coupling sleeve 502 may instead include threads 504 used to threadably engage corresponding threads 506 defined on the lower (second) pipe 102b. In the illustrated embodiment, the threads 504 of the lower end 108b are defined on the inner radial surface thereof, and the threads 506 of the lower pipe 102b are defined on the outer radial surface thereof. In other embodiments, however, the threads 504 of the lower end 108b may be defined on the outer radial surface thereof, and the threads 506 of the lower pipe 102b may be defined on the inner radial surface thereof, without departing from the scope of the disclosure. In some embodiments, the coupling restriction 204 may be included in the coupling system 500. In other embodiments, the coupling restriction 204 may be omitted, without departing from the scope of the disclosure.

Accordingly, the upper pipe 102a may be a plain end pipe, and the lower pipe 102b may be a threaded end pipe. Moreover, while a pipe is shown as the lower pipe 102b, it is equally contemplated herein to replace the lower pipe 102b with a threaded downhole tool. Such an embodiment may prove useful in coring applications, for example.

Embodiments disclosed herein include:

A. A coupling system that includes a coupling sleeve having opposing upper and lower ends and a plurality of axially extending slots defined in each of the upper and lower ends, wherein the upper end is configured to receive an end of a first pipe and the lower end is configured to receive an end of a second pipe, an upper sliding ring disposed about the coupling sleeve and configured to axially move in a first direction, wherein, as the upper sliding ring moves in the first direction, the upper end is forced into gripping engagement with an outer surface of the first pipe, and a lower sliding ring disposed about the coupling sleeve and configured to axially move in a second direction opposite the first direction, wherein, as the lower sliding ring moves in the second direction, the lower end is forced into gripping engagement with an outer surface of the second pipe.

B. A method of coupling a first pipe to a second pipe. The method includes inserting the first pipe into an upper end of a coupling sleeve, inserting the second pipe into a lower end of the coupling sleeve, the upper and lower ends defining a plurality of axially extending slots, axially moving an upper sliding ring disposed about the coupling sleeve in a first direction and thereby forcing the upper end radially inward and into gripping engagement with an outer surface of the first pipe, and axially moving a lower sliding ring disposed about the coupling sleeve in a second direction opposite the first direction and thereby forcing the lower end radially inward and into gripping engagement with an outer surface of the second pipe.

C. A coupling system that includes a coupling sleeve having opposing upper and lower ends and a plurality of axially extending slots defined in at least the upper ends, wherein the upper end is configured to receive an end of a first pipe and the lower end is configured to receive an end of a second pipe, an upper sliding ring disposed about the coupling sleeve and configured to axially move such that the upper end is forced into gripping engagement with an outer surface of the first pipe, and threading defined on the lower end and configured to threadably engage corresponding threading defined on the end of the second pipe.

Each of embodiments A, B, and C may have one or more of the following additional elements in any combination: Element 1: wherein one or both of the first and second pipes are plain end pipes. Element 2: wherein the first and second pipes are made of materials selected from the group consisting of metals, plastics, and composite materials. Element 3: further comprising a first seal arranged between the coupling sleeve and the first pipe, and a second seal arranged between the coupling sleeve and the second pipe, the first and second seals being configured to seal corresponding interfaces between the coupling sleeve and the first and second pipes. Element 4: further comprising a radially extending coupling restriction defined on an inner surface of the coupling sleeve and configured to engage corresponding ends of the first and second pipes when introduced into the upper and lower ends, respectively. Element 5: wherein at least one of the upper and lower ends is radially expanded. Element 6: wherein the upper and lower ends exhibit a first thickness and remaining portions of the coupling sleeve exhibit a second thickness that is less than the first thickness. Element 7: wherein at least one of the upper and lower sliding rings defines a tapered inner surface. Element 8: further comprising a gripping interface defined on respective inner surfaces of the upper and lower ends. Element 9: wherein the gripping interface comprises a series of teeth defined in the respective inner surfaces of the upper and lower ends. Element 10: wherein the gripping interface comprises an abrasive material applied to the respective inner surfaces of the upper and lower ends. Element 11: further comprising a gripping interface disposed on an outer surface of at least one of the first or second pipes.

Element 12: further comprising advancing each of the first and second pipes into the coupling sleeve until engaging a radially extending coupling restriction defined on an inner surface of the coupling sleeve. Element 13: wherein axially moving the upper and lower sliding rings comprises forcing the upper and lower sliding rings in the first and second directions, respectively, with at least one of a sledge hammer and a plier device. Element 14: wherein axially moving the upper and lower sliding rings comprises rotating the upper and lower sliding rings through corresponding threaded engagements between the upper and lower sliding rings and an outer surface of the coupling sleeve. Element 15: further including sealing a first interface between the coupling sleeve and the first pipe with a first seal arranged between the coupling sleeve and the first pipe, and sealing a second interface between the coupling sleeve and the second pipe with a second seal arranged between the coupling sleeve and the second pipe. Element 16: further including gripping an outer surface of the first and second pipes with gripping interfaces defined on corresponding inner surfaces of the upper and lower ends.

Element 17: wherein the threading of the lower end is defined on an inner surface of the lower end and the threading of the end of the second pipe is defined on an outer surface of the second pipe. Element 18: wherein the threading of the lower end is defined on an outer surface of the lower end and the threading of the end of the second pipe is defined on an inner surface of the second pipe. Element 19: wherein the first and second pipes are made of materials selected from the group consisting of metals, plastics, and composite materials.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of"

the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A coupling system, comprising:
   a coupling sleeve having opposing upper and lower ends, an intermediate portion disposed between the upper and lower ends, and a plurality of axially extending slots defined in each of the upper and lower ends, wherein the upper end is configured to receive a proximal end of a first pipe and is flared radially outwardly at a first angle relative to the intermediate portion, and wherein the lower end is configured to receive a proximal end of a second pipe and is flared radially outwardly at a second angle relative to the intermediate portion;
   an upper sliding ring disposed about the coupling sleeve and axially movable in a first direction from a first position to a second position distally located from the proximal end of the first pipe, in response to which the upper end is forced radially inward into gripping engagement with an outer surface of the first pipe, wherein the upper sliding ring has an inner surface tapered at an angle substantially corresponding to the first angle of the upper end;
   a lower sliding ring disposed about the coupling sleeve and axially movable in a second direction opposite the first direction and away from the upper sliding ring, from a first position to a second position distally located from the proximal end of the second pipe, in response to which the lower end is forced radially inward into gripping engagement with an outer surface of the second pipe, wherein the lower sliding ring has an inner surface tapered at an angle substantially corresponding to the second angle of the lower end; and
   wherein the proximal end of the first pipe is tapered or frustoconical in shape, wherein the proximal end of the second pipe is tapered or frustoconical in shape, and wherein the coupling sleeve exhibits an outer diameter that is substantially equal to or less than an outer diameter of the first pipe and an outer diameter of the second pipe when the upper end is in the gripping engagement with the outer surface of first pipe and the lower end is in the gripping engagement with the outer surface of the second pipe.

2. The coupling system of claim 1, wherein one or both of the first and second pipes are plain end pipes made of a rigid material.

3. The coupling system of claim 1, further comprising:
   a first seal arranged between the coupling sleeve and the first pipe; and
   a second seal arranged between the coupling sleeve and the second pipe, the first and second seals being configured to seal corresponding interfaces between the coupling sleeve and the first and second pipes.

4. The coupling system of claim 1, further comprising a radially extending coupling restriction defined on an inner surface of the coupling sleeve and configured to engage corresponding ends of the first and second pipes when introduced into the upper and lower ends, respectively.

5. The coupling system of claim 1, wherein the upper and lower ends exhibit a first thickness and remaining portions of the coupling sleeve exhibit a second thickness that is less than the first thickness.

6. The coupling system of claim 1, further comprising a gripping interface defined on respective inner surfaces of the upper and lower ends.

7. The coupling system of claim 6, wherein the gripping interface comprises a series of teeth defined in the respective inner surfaces of the upper and lower ends.

8. The coupling system of claim 6, wherein the gripping interface comprises an abrasive material applied to the respective inner surfaces of the upper and lower ends.

9. The coupling system of claim 1, further comprising a gripping interface disposed on an outer surface of at least one of the first or second pipes.

10. A method of coupling a first pipe to a second pipe, comprising:
    inserting a proximal end of the first pipe into an upper end of a coupling sleeve;
    inserting a proximal end of the second pipe into a lower end of the coupling sleeve, the coupling sleeve having an intermediate portion disposed between the upper and lower ends, the upper and lower ends defining a plurality of axially extending slots the upper end being flared radially outwardly at a first angle relative to the intermediate portion, and the lower end being flared radially outwardly at a second angle relative to the intermediate portion;
    axially moving an upper sliding ring disposed about the coupling sleeve in a first direction from a first position to a second position distally located from the proximal end of the first pipe, the upper sliding ring having an inner surface tapered at an angle substantially corresponding to the first angle of the upper end, and the axial movement of the upper sliding ring engaging the first angle of the upper end with the angle of the inner surface and forcing the upper end radially inward into gripping engagement with an outer surface of the first pipe;
    axially moving a lower sliding ring disposed about the coupling sleeve in a second direction opposite the first direction and away from the upper sliding ring, from a first position to a second position distally located from the proximal end of the second pipe, the lower sliding ring having an inner surface tapered at an angle substantially corresponding to the second angle of the lower end, and the axial movement of the lower sliding ring engaging the second angle of the lower end with the angle of the inner surface and forcing the lower end radially inward into gripping engagement with an outer surface of the second pipe; and
    wherein the proximal end of the first pipe is tapered or frustoconical in shape, wherein the proximal end of the second pipe is tapered or frustoconical in shape, and wherein the coupling sleeve exhibits an outer diameter that is substantially equal to or less than an outer diameter of the first pipe and an outer diameter of the second pipe when the upper end is in the gripping engagement with the outer surface of first pipe and the lower end is in the gripping engagement with the outer surface of the second pipe.

11. The method of claim 10, further comprising advancing each of the first and second pipes into the coupling sleeve until engaging a radially extending coupling restriction defined on an inner surface of the coupling sleeve.

12. The method of claim 10, wherein axially moving the upper and lower sliding rings comprises forcing the upper and lower sliding rings in the first and second directions, respectively, with at least one of a sledge hammer and a plier device.

13. The method of claim 10, wherein axially moving the upper and lower sliding rings comprises rotating the upper and lower sliding rings through corresponding threaded engagements between the upper and lower sliding rings and an outer surface of the coupling sleeve.

14. The method of claim 10, further comprising:
sealing a first interface between the coupling sleeve and the first pipe with a first seal arranged between the coupling sleeve and the first pipe; and
sealing a second interface between the coupling sleeve and the second pipe with a second seal arranged between the coupling sleeve and the second pipe.

15. The method of claim 10, further comprising gripping an outer surface of the first and second pipes with gripping interfaces defined on corresponding inner surfaces of the upper and lower ends.

16. A coupling system, comprising:
a coupling sleeve having opposing upper and lower ends, an intermediate portion disposed between the upper and lower ends, and a plurality of axially extending slots defined in at least the upper end, wherein the upper end is configured to receive a proximal end of a first pipe and is flared radially outwardly at a first angle relative to the intermediate portion, and wherein the lower end is configured to receive a proximal end of a second pipe;
an upper sliding ring disposed about the coupling sleeve intermediate the upper and lower ends thereof and configured to axially move away from the lower end from a first position to a second position distally located from the proximal end of the first pipe, in response to which the upper end is forced radially inward into gripping engagement with an outer surface of the first pipe, wherein the upper sliding ring has an inner surface tapered at an angle substantially corresponding to the first angle of the upper end; and
threading defined on the lower end and configured to threadably engage corresponding threading defined on the proximal end of the second pipe.

17. The coupling system of claim 16, wherein the threading of the lower end is defined on an inner surface of the lower end and the threading of the proximal end of the second pipe is defined on an outer surface of the second pipe.

18. The coupling system of claim 16, wherein the threading of the lower end is defined on an outer surface of the lower end and the threading of the proximal end of the second pipe is defined on an inner surface of the second pipe.

* * * * *